United States Patent
Falter et al.

(10) Patent No.: US 9,430,523 B2
(45) Date of Patent: Aug. 30, 2016

(54) ENTITY-RELATIONSHIP MODEL EXTENSIONS USING ANNOTATIONS

(71) Applicants: Timm Falter, Walldorf (DE); Daniel Hutzel, Walldorf (DE); Stefan Baeuerle, Walldorf (DE)

(72) Inventors: Timm Falter, Walldorf (DE); Daniel Hutzel, Walldorf (DE); Stefan Baeuerle, Walldorf (DE)

(73) Assignee: SAP SE, Walldorf (DE)

( * ) Notice: Subject to any disclaimer, the term of this patent is extended or adjusted under 35 U.S.C. 154(b) by 110 days.

(21) Appl. No.: 14/020,664

(22) Filed: Sep. 6, 2013

(65) Prior Publication Data

US 2015/0074081 A1 Mar. 12, 2015

(51) Int. Cl.
*G06F 17/30* (2006.01)

(52) U.S. Cl.
CPC ... *G06F 17/30404* (2013.01); *G06F 17/30424* (2013.01); *G06F 17/30427* (2013.01); *G06F 17/30525* (2013.01); *G06F 17/30595* (2013.01); *G06F 17/30604* (2013.01)

(58) Field of Classification Search
None
See application file for complete search history.

(56) References Cited

U.S. PATENT DOCUMENTS

| | | | |
|---|---|---|---|
| 5,761,493 A | 6/1998 | Blakeley et al. |
| 5,956,706 A | 9/1999 | Carey et al. |
| 5,999,908 A | 12/1999 | Abelow |
| 6,038,558 A | 3/2000 | Powers et al. |
| 6,195,709 B1 | 2/2001 | Gupner et al. |
| 6,516,310 B2 | 2/2003 | Paulley |
| 6,560,598 B2 | 5/2003 | Delo et al. |
| 6,567,798 B1 | 5/2003 | Hollberg et al. |
| 6,631,382 B1 | 10/2003 | Kouchi et al. |
| 6,732,084 B1 | 5/2004 | Kabra et al. |
| 6,799,184 B2 | 9/2004 | Bhatt et al. |
| 6,836,777 B2 | 12/2004 | Holle |
| 6,898,603 B1 | 5/2005 | Petculescu et al. |
| 6,938,041 B1 | 8/2005 | Brandow et al. |
| 6,996,568 B1 | 2/2006 | Bedell et al. |
| 7,107,497 B2 | 9/2006 | McGuire et al. |
| 7,194,744 B2 | 3/2007 | Srivastava et al. |
| 7,225,197 B2 | 5/2007 | Lissar et al. |
| 7,290,181 B2 | 10/2007 | D'Angelo et al. |
| 7,302,447 B2 | 11/2007 | Dettinger et al. |
| 7,305,414 B2 | 12/2007 | Manikutty et al. |
| 7,340,451 B2 | 3/2008 | Sacco |
| 7,380,169 B2 | 5/2008 | Fossum et al. |
| 7,398,530 B1 | 7/2008 | Parla et al. |
| 7,421,448 B2 | 9/2008 | Spork |
| 7,434,230 B2 | 10/2008 | Harold et al. |
| 7,481,368 B2 | 1/2009 | Wang et al. |
| 7,505,983 B2 | 3/2009 | Wildhagen et al. |

(Continued)

OTHER PUBLICATIONS

Pattern: Fill Transient Attributes of Persistent Nodes; SAP; Jul. 6, 2013; p. 1.
Graphics: Display Method (SAP-SERM); Sap Library—BC Data Modeler; 2004; pp. 1-5.
Abovesoft Utilities; www.AboveSoft.com; Sep. 2010; pp. 1-6.
Ayers, Lonnie, PMP; SAP BW Data Modeling; SAP-BW Consulting, Inc.; pp. 1-18, printed on Aug. 29, 2013.
Heilman, Rich, HANA Product Management, SAP Labs LLC; Steyn, Werner, Customer Solution Adoption, SAP Labs, LLC; SAP HANA SQL Script Basics & Troubleshooting; Oct. 2012; pp. 1-47.
Ruby on Rails Guides, "Active Record Validations," Aug. 8, 2013, downloaded from the Internet at <url>https://web.archive.org/web/20130808005838/http://guides.rubyonrails.org/active_record_validations.html on Aug. 27, 2015, pp. 1-37.
Bhargava, "Concurrency control in database systems," 1999, IEEE Transactions on Knowledge and Data Engineering, vol. 11, Issue 1, pp. 3-16.
Paton et al., "Identification of database objects by key," 2005, Advances in Object-Oriented Database Systems, vol. 334 of the series Lecture Notes in Computer Science, pp. 280-285.
Farber et al., "SAP HANA database: data management for modern business applications," 2011, ACM SIGMOD Record, vol. 40 Issue 4, pp. 45-51.

*Primary Examiner* — Aleksandr Kerzhner
*Assistant Examiner* — Eddy Cheung
(74) *Attorney, Agent, or Firm* — Fountainhead Law Group PC

(57) ABSTRACT

Embodiments extend the relational model and language of standard SQL, to recognize features of higher level entity-relationship models (ERMs). Annotation language is implemented in the data design language (DDL) to incorporate tables and entities Using DDL, annotations are typed structures of metadata. Annotations may be used for types, entities and elements. In the query language (QL), annotations may be added to the standard QL. A reflection program may use the metadata of the annotation language for reflection on the tables or entities.

15 Claims, 11 Drawing Sheets

(56) References Cited

U.S. PATENT DOCUMENTS

| | | |
|---|---|---|
| 7,523,090 B1 | 4/2009 | Sundman et al. |
| 7,640,357 B2 | 12/2009 | Kirov et al. |
| 7,653,828 B2 | 1/2010 | Kostadinov et al. |
| 7,680,782 B2 | 3/2010 | Chen et al. |
| 7,689,612 B2 | 3/2010 | Helsen et al. |
| 7,693,819 B2 | 4/2010 | Stoychev |
| 7,761,481 B2 | 7/2010 | Gaurav et al. |
| 7,765,222 B2 | 7/2010 | Styles et al. |
| 7,765,224 B2 | 7/2010 | Li et al. |
| 7,788,241 B2 | 8/2010 | Cheng et al. |
| 7,805,433 B2 | 9/2010 | Dickerman et al. |
| 7,818,754 B2 | 10/2010 | Morris et al. |
| 7,836,070 B2 | 11/2010 | Forstmann |
| 7,873,605 B2 | 1/2011 | Bhattacharyya et al. |
| 7,885,840 B2 | 2/2011 | Sadiq et al. |
| 7,895,226 B2 | 2/2011 | Koch et al. |
| 7,912,820 B2 | 3/2011 | Garden et al. |
| 7,937,401 B2 | 5/2011 | Pasumansky et al. |
| 7,970,823 B2 | 6/2011 | Moeller et al. |
| 7,975,254 B2 | 7/2011 | Gilboa |
| 7,996,443 B2 | 8/2011 | Nori et al. |
| 8,005,850 B2 | 8/2011 | Walther et al. |
| 8,010,521 B2 | 8/2011 | Kissner et al. |
| 8,065,323 B2 | 11/2011 | Sallakonda et al. |
| 8,069,184 B2 | 11/2011 | Becker et al. |
| 8,078,643 B2 | 12/2011 | Mush et al. |
| 8,122,009 B2 | 2/2012 | Dettinger et al. |
| 8,146,103 B2 | 3/2012 | Schmidt et al. |
| 8,185,508 B2 | 5/2012 | Vemuri et al. |
| 8,191,081 B2 | 5/2012 | Schmidt et al. |
| 8,209,280 B2 | 6/2012 | Kearney et al. |
| 8,214,877 B1 | 7/2012 | Grimes et al. |
| 8,219,919 B2 | 7/2012 | Norring et al. |
| 8,250,094 B2 | 8/2012 | Skaria et al. |
| 8,255,368 B2 | 8/2012 | Cox |
| 8,281,283 B2 | 10/2012 | Speth et al. |
| 8,286,916 B2 | 10/2012 | Pauly et al. |
| 8,327,260 B2 | 12/2012 | Bays et al. |
| 8,347,207 B2 | 1/2013 | Borgsmidt et al. |
| 8,364,300 B2 | 1/2013 | Pouyez et al. |
| 8,364,724 B2 | 1/2013 | Stolte et al. |
| 8,370,400 B2 | 2/2013 | Brunswig et al. |
| 8,375,041 B2 | 2/2013 | Webster et al. |
| 8,386,916 B2 | 2/2013 | LeBrazidec et al. |
| 8,407,215 B2 | 3/2013 | Sheedy et al. |
| 8,407,237 B1 | 3/2013 | Kudryavtsev et al. |
| 8,407,262 B2 | 3/2013 | Hsu et al. |
| 8,407,309 B1 | 3/2013 | Feldman et al. |
| 8,412,673 B2 | 4/2013 | Weissenberger et al. |
| 8,417,732 B2 | 4/2013 | Rapp |
| 8,429,176 B2 | 4/2013 | Sigurbjornsson et al. |
| 8,473,506 B2 | 6/2013 | Sedlar et al. |
| 8,478,515 B1 | 7/2013 | Foucher et al. |
| 8,478,850 B2 | 7/2013 | Delany et al. |
| 8,484,210 B2 | 7/2013 | Loh et al. |
| 8,489,649 B2 | 7/2013 | Yalamanchi et al. |
| 8,504,522 B2 | 8/2013 | Wu et al. |
| 8,504,568 B2 | 8/2013 | Chandrasekhara et al. |
| 8,505,032 B2 | 8/2013 | Craddock et al. |
| 8,510,296 B2 | 8/2013 | Fan et al. |
| 8,515,982 B1 | 8/2013 | Hickman et al. |
| 8,805,875 B1 | 8/2014 | Bawcom et al. |
| 8,849,771 B2 | 9/2014 | Berg-Sonne |
| 9,047,334 B1 | 6/2015 | Cheriton |
| 2002/0100014 A1 | 7/2002 | Iborra et al. |
| 2002/0138820 A1 | 9/2002 | Daly |
| 2003/0009649 A1 | 1/2003 | Martin et al. |
| 2003/0135850 A1 | 7/2003 | Miloushev et al. |
| 2003/0140036 A1 | 7/2003 | Belowsov |
| 2003/0145255 A1 | 7/2003 | Harty et al. |
| 2004/0117759 A1 | 6/2004 | Rippert, Jr. et al. |
| 2004/0122817 A1 | 6/2004 | Kaiser |
| 2004/0153435 A1* | 8/2004 | Gudbjartsson et al. ........ 707/1 |
| 2004/0249856 A1 | 12/2004 | Garden et al. |
| 2005/0004904 A1 | 1/2005 | Kearney et al. |
| 2005/0010565 A1 | 1/2005 | Cushing et al. |
| 2005/0065958 A1* | 3/2005 | Dettinger et al. .......... 707/102 |
| 2005/0187952 A1 | 8/2005 | Werner |
| 2005/0256889 A1* | 11/2005 | McConnell .................. 707/100 |
| 2005/0283459 A1 | 12/2005 | MacLennan et al. |
| 2006/0195460 A1 | 8/2006 | Nori et al. |
| 2006/0195476 A1 | 8/2006 | Nori et al. |
| 2006/0215448 A1 | 9/2006 | Ellis et al. |
| 2006/0224634 A1 | 10/2006 | Hahn et al. |
| 2006/0235834 A1 | 10/2006 | Blakeley et al. |
| 2006/0242104 A1 | 10/2006 | Ellis et al. |
| 2006/0259912 A1 | 11/2006 | Weinrich et al. |
| 2007/0083572 A1 | 4/2007 | Bland et al. |
| 2007/0118501 A1 | 5/2007 | Yan |
| 2007/0136335 A1 | 6/2007 | Dionne et al. |
| 2007/0219976 A1* | 9/2007 | Muralidhar et al. ............. 707/4 |
| 2007/0226203 A1 | 9/2007 | Adya et al. |
| 2008/0065862 A1 | 3/2008 | Hansen et al. |
| 2008/0071799 A1 | 3/2008 | Evans et al. |
| 2008/0091691 A1 | 4/2008 | Tsuji |
| 2008/0120604 A1 | 5/2008 | Morris |
| 2008/0133530 A1 | 6/2008 | Wang et al. |
| 2008/0222159 A1 | 9/2008 | Aranha et al. |
| 2008/0301168 A1* | 12/2008 | Adler et al. .................. 707/102 |
| 2009/0240664 A1 | 9/2009 | Dinker et al. |
| 2009/0292730 A1 | 11/2009 | Li et al. |
| 2010/0082646 A1* | 4/2010 | Meek .................. G06F 17/3056 707/752 |
| 2010/0114935 A1 | 5/2010 | Polo-Malouvier et al. |
| 2010/0131568 A1 | 5/2010 | Weinberg et al. |
| 2010/0241637 A1 | 9/2010 | Kissner et al. |
| 2010/0293523 A1* | 11/2010 | Ahadian .................... G06F 8/10 717/108 |
| 2010/0318499 A1 | 12/2010 | Arasu et al. |
| 2011/0154226 A1 | 6/2011 | Guertler et al. |
| 2011/0161371 A1 | 6/2011 | Thomson et al. |
| 2011/0225176 A1 | 9/2011 | Siegel et al. |
| 2011/0231454 A1* | 9/2011 | Mack ............................ 707/803 |
| 2011/0238437 A1 | 9/2011 | Zhou et al. |
| 2011/0302212 A1 | 12/2011 | Agrawal et al. |
| 2012/0005190 A1* | 1/2012 | Faerber ............. G06F 17/30404 707/718 |
| 2012/0016901 A1 | 1/2012 | Agarwal et al. |
| 2012/0054142 A1 | 3/2012 | Du et al. |
| 2012/0059802 A1 | 3/2012 | Daniello et al. |
| 2012/0109661 A1 | 5/2012 | Lueckhoff |
| 2012/0130942 A1 | 5/2012 | Dipper et al. |
| 2012/0131392 A1 | 5/2012 | Bendig |
| 2012/0136868 A1* | 5/2012 | Hammerschmidt ...................... G06F 17/30312 707/741 |
| 2012/0143810 A1 | 6/2012 | Berg-Sonne |
| 2012/0144383 A1 | 6/2012 | Mishra et al. |
| 2012/0215768 A1 | 8/2012 | Zellweger |
| 2012/0239987 A1 | 9/2012 | Chow |
| 2012/0265734 A1* | 10/2012 | Perez ................. G06F 17/30292 707/687 |
| 2013/0110879 A1 | 5/2013 | Winternitz et al. |
| 2013/0111310 A1 | 5/2013 | deOliveira et al. |
| 2013/0117346 A1 | 5/2013 | Figus |
| 2013/0151560 A1 | 6/2013 | Zurek |
| 2013/0159354 A1 | 6/2013 | Heinzl et al. |
| 2013/0166602 A1 | 6/2013 | Brunswig et al. |
| 2013/0246355 A1 | 9/2013 | Nelson et al. |
| 2014/0149180 A1 | 5/2014 | Yaseen et al. |
| 2014/0245079 A1 | 8/2014 | Larson et al. |
| 2014/0258777 A1 | 9/2014 | Cheriton |
| 2014/0330916 A1 | 11/2014 | Xu et al. |
| 2014/0380266 A1 | 12/2014 | Bornhoevd et al. |

* cited by examiner

ENTITY-RELATIONSHIP MODEL EXTENSIONS USING ANNOTATIONS

BACKGROUND

Embodiments relate to databases, and in particular, to annotating extensions to a database language to accommodate higher level entity-relationship models.

Unless otherwise indicated herein, the approaches described in this section are not prior art to the claims in this application and are not admitted to be prior art by inclusion in this section.

A database is a powerful tool for the storage, organization, and analysis of large volumes of data. At a low level, a database may employ fundamental data definition and processing that is based upon a relational model. In particular, a data definition defines a data type with sufficient metadata being associated therewith. A data definition may also involve a definition of a database structure such as columns and tables. Many database structures rely upon Structured Query Language (SQL) as the standard database language to define, read, and manipulate data within a database. In its standard form, SQL itself reflects the basic relational model of the database.

Various other types of applications (e.g., toolsets) are constructed by developers to allow consumers to interact with the database in an efficient and intuitive manner. Such applications are typically provided in an application layer overlying the database.

The overlying applications, such as consumer technology and toolsets provided by developers, may introduce higher-level models, e.g., entity-relationship models (ERMs), in order to contribute semantics and ease consumption by the user. In particular, a plain data model on the SQL-level only contains the requisite information to process data on the SQL-level. Adding more information in a declarative fashion provides potential for higher-level engines to offload work from developers by contributing more semantics. Adding more information in a declarative fashion can also make data models more comprehensible, thereby easing their consumption by users.

One example of a higher-level model is an OData Entity Data Model (EDM). In particular, OData is a web protocol standard providing platform-agnostic interoperability for querying and updating data. OData leverages web technologies such as HTTP, Atom Publishing Protocol (AtomPub), and JSON (JavaScript Object Notation) in order to provide access to information from a variety of applications. The simplicity and extensibility of OData can provide consumers with a predictable interface for querying a variety of data sources.

Other examples of higher-level models may include the Semantic Layer in the Business Intelligence (BI) platform of SAP AG in Walldorf, Germany, Java Persistence API (JPA) and enterprise objects in Java, or the business objects frameworks in Advanced Business Application Programming (ABAP) of SAP AG. Also, the River programming model and the River Definition Language (RDL) of the River application development framework for SAP AG in Walldorf, Germany, are based upon entities linked by relationships.

Even though those higher-level models may share many commonalities, the individual information cannot be shared across stacks. That is, the higher-level models mentioned above contribute essentially the same kind of additional information, yet that information is provided in different ways that interfere with its being shared across higher-level models (e.g., between an OData EDM and an ERM created using RDL).

This situation results in a fragmented environment with information unable to be shared between applications. To cope with this fragmentation, redundant information is provided, with application developers and customers contributing the same essential information in multiple forms, thereby undesirably increasing overhead.

Furthermore, while the developers of consumer technologies may have some knowledge of SQL, they are generally not experts in complex SQL programming. Thus, there is a need for an improved language for interacting with relational databases.

SUMMARY

Embodiments extend the relational model and language of standard SQL, to recognize features of higher level entity-relationship models (ERMs). Annotation language is implemented in the data design language (DDL) that defines organization of data and associated metadata in a database, to incorporate tables and entities using DDL, annotations are typed structures of metadata. Annotations may be used for types, entities and elements. In the query language (QL), annotations may be added to the standard QL. A reflection program may use the metadata of the annotation language for reflection on the tables or entities.

A computer-implemented method according to an embodiment comprises providing a database organized according to a relational model; providing a database engine in communication with the database utilizing a language describing the relational model; providing an application comprising an entity-relationship model (ERM) including a first entity, a second entity, and a relationship between the first entity and the second entity, and elements; causing a query engine of the application to communicate a query to the database engine utilizing an annotation language, the annotation language comprising a typed structure of metadata related to the first entity, the second entity and the elements; and causing the database engine to return a query result to the query engine based upon the annotation language.

In various embodiments, the method further comprises reflecting at runtime on the annotation language.

A non-transitory computer readable storage medium embodies a computer program for performing a method comprising providing a database organized according to a relational model; providing a database engine in communication with the database utilizing a language describing the relational model; providing an application comprising an entity-relationship model (ERM) including a first entity, a second entity, and a relationship between the first entity and the second entity, and elements; causing a query engine of the application to communicate a query to the database engine utilizing an annotation language, the annotation language comprising a typed structure of metadata related to the first entity, the second entity and the elements; and causing the database engine to return a query result to the query engine based upon the annotation language.

An embodiment of a computer system comprises one or more processors and a software program executable on said computer system. The software program is configured to provide a database organized according to a relational model, provide a database engine in communication with the database utilizing a language describing the relational model, provide an application comprising an entity-relationship model (ERM) including a first entity, a second entity, and a relationship between the first entity and the second entity, and elements, and cause a query engine of the application to communicate a query to the database engine utilizing an annotation language, the annotation language comprising a typed structure of metadata related to the first entity, the second entity and the elements, and cause the database engine to return a query result to the query engine based upon the annotation language.

In various embodiments, the processor is further configured to reflect at runtime on the annotation language.

In various embodiments, the language comprises SQL.

In various embodiments, the annotation language is a chain of successively included annotation language.

In various embodiments, the annotation language is added to a pre-defined view of the ERM.

In various embodiments, the annotation language includes metadata on types, entities and elements in data model definitions of the ERM.

The following detailed description and accompanying drawings provide a better understanding of the nature and advantages of various embodiments.

DETAILED DESCRIPTION

Described herein are techniques for annotating language extensions of a relational model-based database language (e.g., Structured Query Language known as SQL), to accommodate higher level entity-relationship models. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
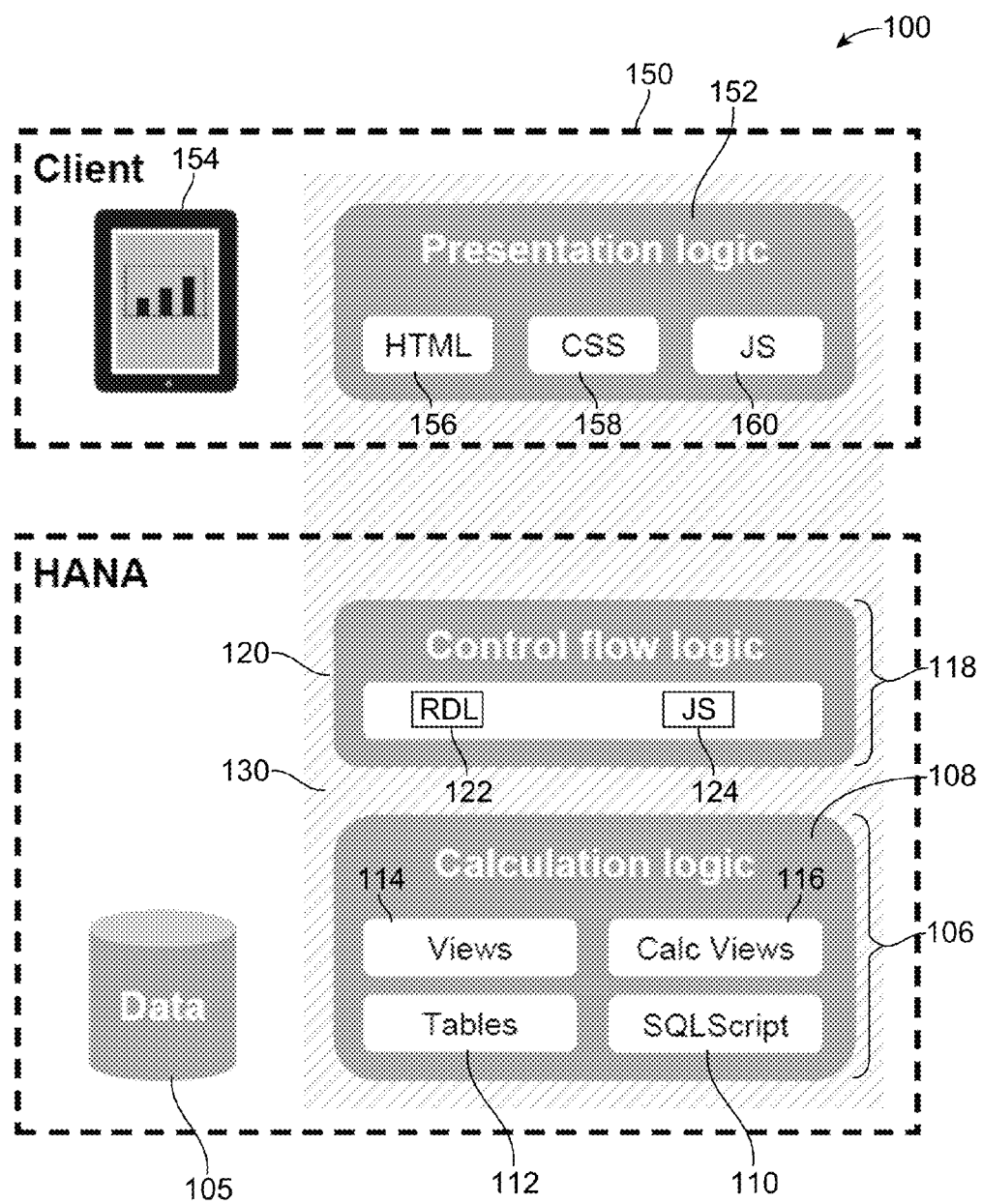
FIG. 1 shows a simplified view of a database system 100 according to an embodiment.

FIG. 1 shows a simplified view of a database system 100, according to an embodiment. In particular, the database system 100 comprises data 105 of the database itself, organized according to a relational model.

A lower layer 106 of the database system comprises calculation logic 108 that is designed to interact with the data 105 itself. Such calculation logic 108 may be performed by various engines (e.g., SQL engine, calculation engine, SQL script) in order to provide basic data definition and processing based on the relational model. Such basic data definition can include defining of data types making up the database, associated metadata, and the database structure (e.g. columns, tables). The lower layer 106 of the database system may include SQL script 110, as well as data structures such as tables 112, views 114, and calculation views 116.

The embodiment presented in FIG. 1 shows HANA, the in-memory database available from SAP AG of Walldorf, Germany, implemented as the database. However, embodiments are not limited to use with this particular database. Examples of other in-memory databases include, but are not limited to, the SYBASE IQ database also available from SAP AG; the Microsoft Embedded SQL for C (ESQL/C) database available from Microsoft Corp. of Redmond, Wash.; the Exalytics In-Memory database available from Oracle Corp. of Redwood Shores, Calif., etc.

Further, while the embodiment presented in FIG. 1 shows the database as comprising an in-memory database, various embodiments could be employed in conjunction with conventional disk-based database systems.

An application layer 118, overlying the calculation logic 108 of the database system 100 comprises control flow logic 120. The control flow logic 120 may be implemented utilizing River Definition Language (RDL) 122 and JavaScript (JS) 124 to reference model concepts such as entities and relationships that are not reflected in basic SQL. This control flow logic 120 may further comprise common languages for defining and consuming data across different containers (e.g. native, ABAP, Java).

As shown in FIG. 1, in order to facilitate the sharing of information across such different containers and thereby promote a more unified environment, the database system 100 may further comprise a Core Data Services (CDS) component 130. CDS component 130 comprises a common set of domain-specific languages (DSL) and services. The CDS component 130 may allow defining and consuming semantically rich data models as an integral part of the database structure, thereby permitting data modeling as well as the retrieval and processing of data to be raised to a higher semantic level that is closer to the conceptual thinking of domain experts. The role of the CDS component 130 is discussed in detail further below.

FIG. 1 further shows client 150 in communication with the HANA in-memory database appliance available from SAP AG. The client 150 includes presentation logic 152 to provide an output 154 comprising data 105 of the underlying database structure in a form desired by a user. Here, the output 154 is shown as a vertical bar chart, but of course this represents only one of a multitude of different ways in which the data may be communicated to a user. The presentation logic 152 may communicate such output in the form of HTML 156, cascading style sheets (CSS) 158, and/or JavaScript 160, or a variety of other user interface technologies.

Figure 2:
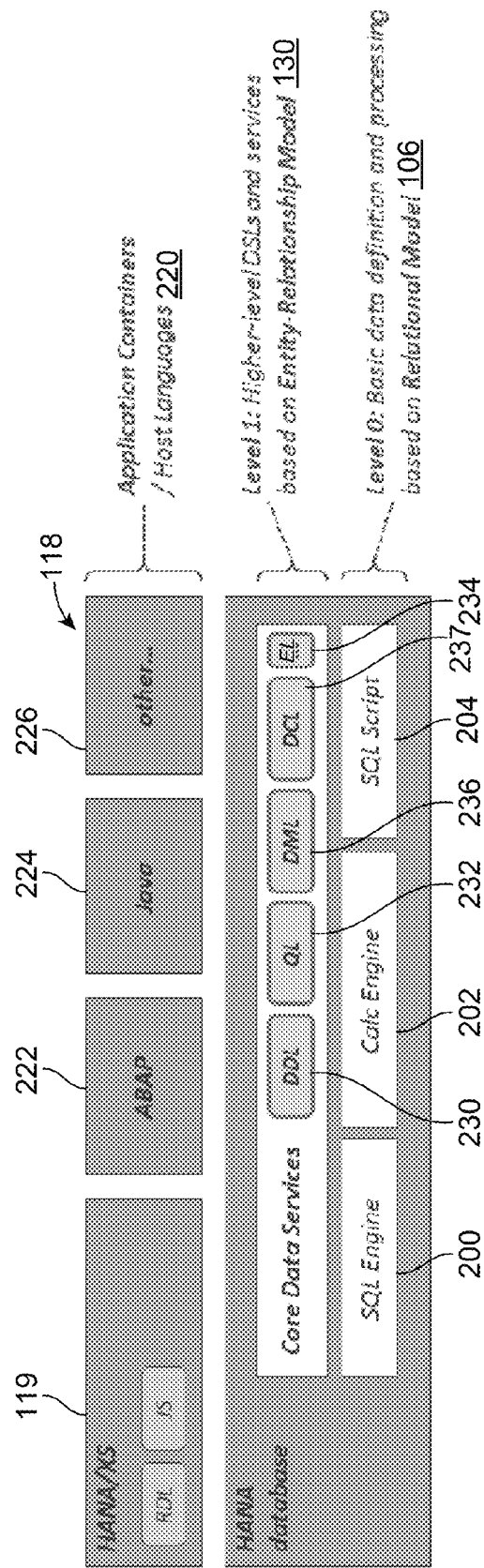
FIG. 2 shows an enlarged view of the database structure of FIG. 1.

FIG. 2 shows an enlarged view of the HANA in-memory database structure of FIG. 1. In particular, FIG. 2 shows SQL engine 200, calculation engine 202, and SQL script 204, as part of the lower layer 106 that performs basic data definition and processing based upon the relational model, according to which the data 105 of the database is organized. FIG. 2 also shows the application layer 118 of the database structure of FIG. 1, including the RDL and JS elements of a query engine 119. The application layer 118 further comprises application containers and other host languages 220, including ABAP 222, Java 224, and others 226.

FIG. 2 further shows the CDS component 130 situated between the lower layer 106 and the application layer 118. As illustrated in this figure, the CDS component 130 can be leveraged in any consuming stack variant (stack of software layers located on top of each other), as implemented through the application layer 118. Specifically, services in higher layers can use/consume the services of lower layers. Here, because the application layer sits on top of a data layer in which the CDS component 130 resides, definition and consumption of the semantically rich higher-level models is allowed.

In particular, the CDS component 130 implements higher-level Domain Specific Languages (DSLs) and services based on an entity-relationship model (ERM). The Data Definition Language (DDL) 230 is used for defining semantically rich data models, including the data types, associated metadata, and database organization (e.g., columns and tables). As mentioned throughout, according to embodiments, the DDL may be extended to further enrich these data models through the use of entities and annotations.

The Query Language (QL) 232 is used to conveniently and efficiently read data based on data models. It is also used to define views within data models. The role of the QL 232 and its relation to the DDL 230 is further illustrated in connection with FIG. 3.

The Expression Language (EL) 234 is used to specify calculated fields, default values, constraints, etc., within queries. Calculated fields, default values, and constraints may be specified as well as for elements in data models.

Other elements of the CDS component 130 can include Data Manipulation Language (DML) 236 and a Data Control Language (DCL) 237, both of which may be used to control access to data.

Figure 3:
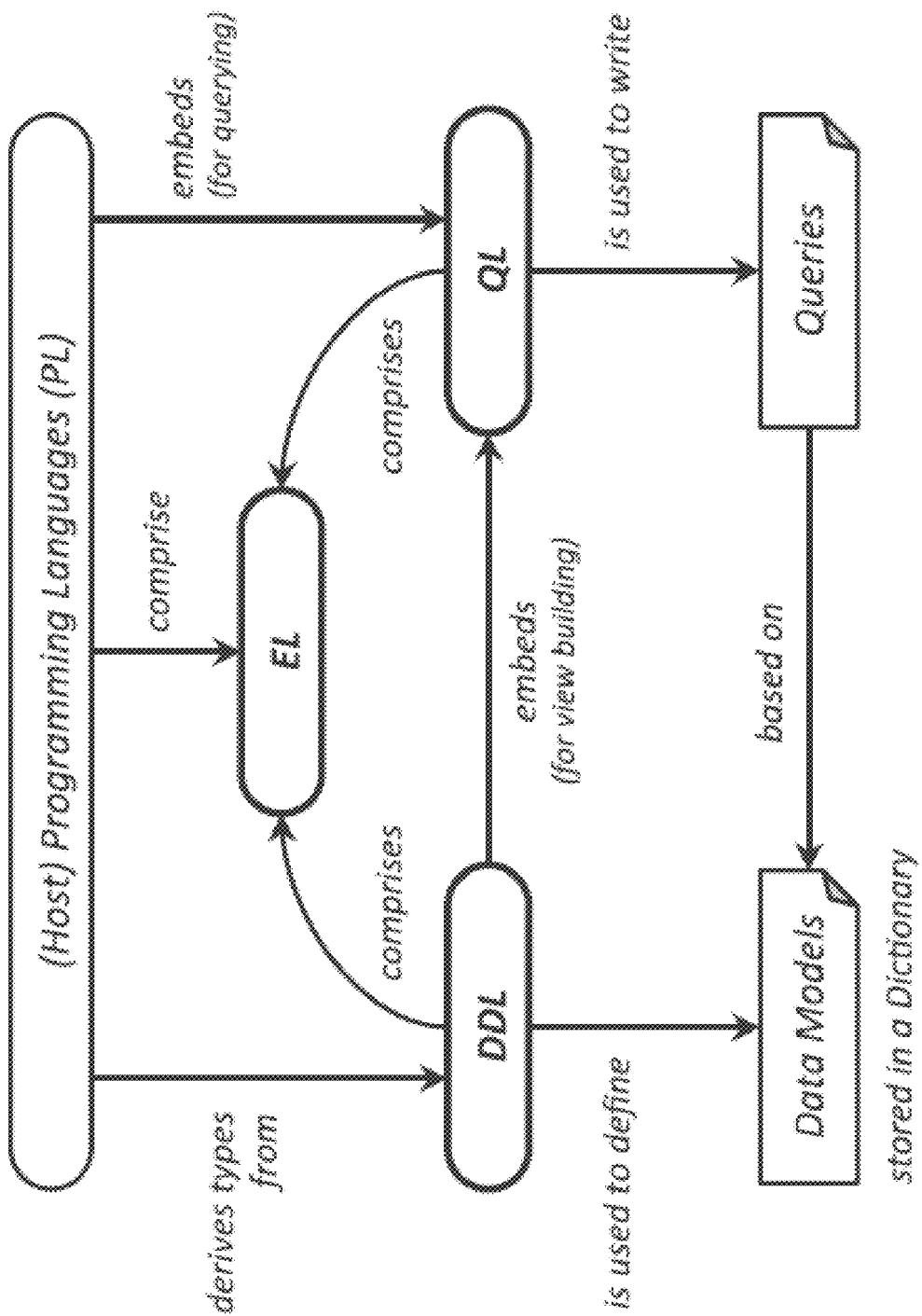
FIG. 3 illustrates relationships between individual languages making up a language family useful for interacting with a database.

Embodiments as described herein may distinguish between the domain-specific languages DDL, QL, and EL as members of a language family. This approach fosters considerations such as modular design, incremental implementation, and reuse. FIG. 3 is a simplified view illustrating relationships between these language family members. A consistent language experience across the members of the family of FIG. 3 can be achieved by ensuring the languages follow a common style. This can extend to the host programming language, with expressions in DDL, QL, and EL code adopting the same syntax. Utilization of application level domain language(s) as has been described above, can offer certain benefits. One possible benefit is that the application domain level language can avoid the use of "inefficient" and error-prone code.

Take, for example, the following simple data model describing employee information:

```
entity Employee {
    name : String(77);
    salary : Amount;   // a structured type
    orgunit : Association to OrgUnit;
    addresses : Association to Address[0..*] via entity
    Employee2Address;
    homeAddress = addresses[kind=home];   // introduced later on
}
entity OrgUnit {
    name : String(111);
    costcenter : String(44);
    manager: Association to Employee;
    parent: Association to OrgUnit;
}
entity Address {
    key streetAddress; key zipCode; city;   // omitted type defs
    kind : enum { home; business; }
}
```

Under some circumstances, it may be desired to write a query statement as follows: SELECT id, name, homeAddress.zipCode FROM Employee WHERE . . . .

Within that sample snippet, path expressions along relationships are used to fetch data from an associated entity. In the simple data model above, the above query statement is equivalent to the following standard SQL statement:

```
SELECT e.id, e.name, a.zipCode FROM Employee e
LEFT OUTER JOIN Employee2Address e2a ON e2a.employee = e.id
LEFT OUTER JOIN Address a ON e2a.address = a.id AND
a.type='homeAddr'
WHERE ...
```

This statement, however, may already be too complex for many application developers. Thus, code patterns similar to that given below, may be used in some pseudo languages:

```
customers = SELECT * FROM Customer
foreach c in customers do
    write c.id
    write c.name
addresses = SELECT * FROM Address a, $Customer2Address c2a
    WHERE a.id = c2a.address AND c2a.customer = :c.id
foreach a in addresses do
    if a.type = 'homeAddr' then write a.zipCode
end
end
```

There are several issues with the code presented immediately above. One issue is the use of an imperative coding style with loops in loops, resulting in 1+n queries being executed or too much data being fetched with a SELECT*statement.

The above code represents only a relatively simple case. A more complex case is found in the following example:

```
SELECT FROM OrgUnit[boardarea='TIP']
    .employees[salary>'$100.000'] {
        addresses[kind=home].city, count(*)
    }
```

The preceding cases illustrate the importance of increasing expressiveness of the languages used in application development (here, the query language). This allows the intent of application developers to be captured, rather than being buried under substantial volumes of imperative boilerplate coding.

Such expressiveness is in turn is fundamental to having optimizations applied by the query engine (in a manner analogous to functional programming vs. imperative programming). This can affect system characteristics, such as its overall performance and scalability. Further, a language's ability to allow developers to draft concise and comprehensive code, can increase developer productivity. It can also reduce the risk of mistakes and also enhance readability, and thus increase the maintainability of the code.

In order to write concise and readable query statements, it is desirable to enrich the data definitions with sufficient metadata (e.g., about associations, semantic types, etc.). Accordingly, embodiments seek to extend the DDL to define data definitions with sufficient metadata, and seek to extend the QL to leverage such definitions.

DDL and QL are declarative, domain-specific languages providing developers with concise ways to express their models and queries. Certain concepts may originate from entity-relationship modeling (ERM). By adding native support for such concepts in the underlying engine of the database, embodiments avoid the impedance mismatch induced by the translation of conceptual models based on ERM into implementations based upon a plain relational model. In particular, writing concise and comprehensive code reduces risks of mistakes and increases readability and maintainability.

Moreover, as the concepts of entity-relationship models may lie at the core of many higher-level models, embodiments are able to capture the semantics of other data models (e.g., RDL-based data models), and share those semantics with database modelers, and/or ABAP of SAP AG, or Java consumers. This reduces fragmentation and the loss of semantics. In addition, since ERM is also the chosen basis for technologies like OData EDM, embodiments can facilitate mapping entities and views to OData entity sets.

Embodiments may employ a functional approach that is based on standard SQL. In particular, the comprehensive, domain-specific nature of DDL and QL allows capturing the intent of application developers, thus avoiding a lack of clarity regarding that intent which can result from large volumes of imperative boilerplate coding. This follows the principles of functional programming and is important for optimizations.

The functional approach may be inherited from SQL. A SQL SELECT statement declares which sub-set of an overall data model is of interest as projections and selections. It may be left to the query engine to determine optimal execution, including parallelizing as appropriate.

In contrast with imperative object traversing patterns, embodiments can speed up many data retrieval use cases. While many of those retrieval cases are not individually expensive, the cumulative impact of this streamlining can have significant impacts on scalability, as it affects all requests over long periods of time.

Embodiments address some of the complexity offered by standard SQL to typical application developers by raising the basis of SQL from plain relational models to the level of conceptual models. This is done by providing native support for ERM in the database system. In this manner, the use of SQL may be reestablished for most application developers, not only for those with the SQL expertise for specific optimization tasks.

Embodiments employ associations in DDL. Specifically, the DDL allows definition of data models as entity-relationship models on a semantically rich level that is close to actual conceptual thought. To achieve this over the conventional relational model of standard SQL, certain concepts are captured by the embodiments described herein.

Figure 4:
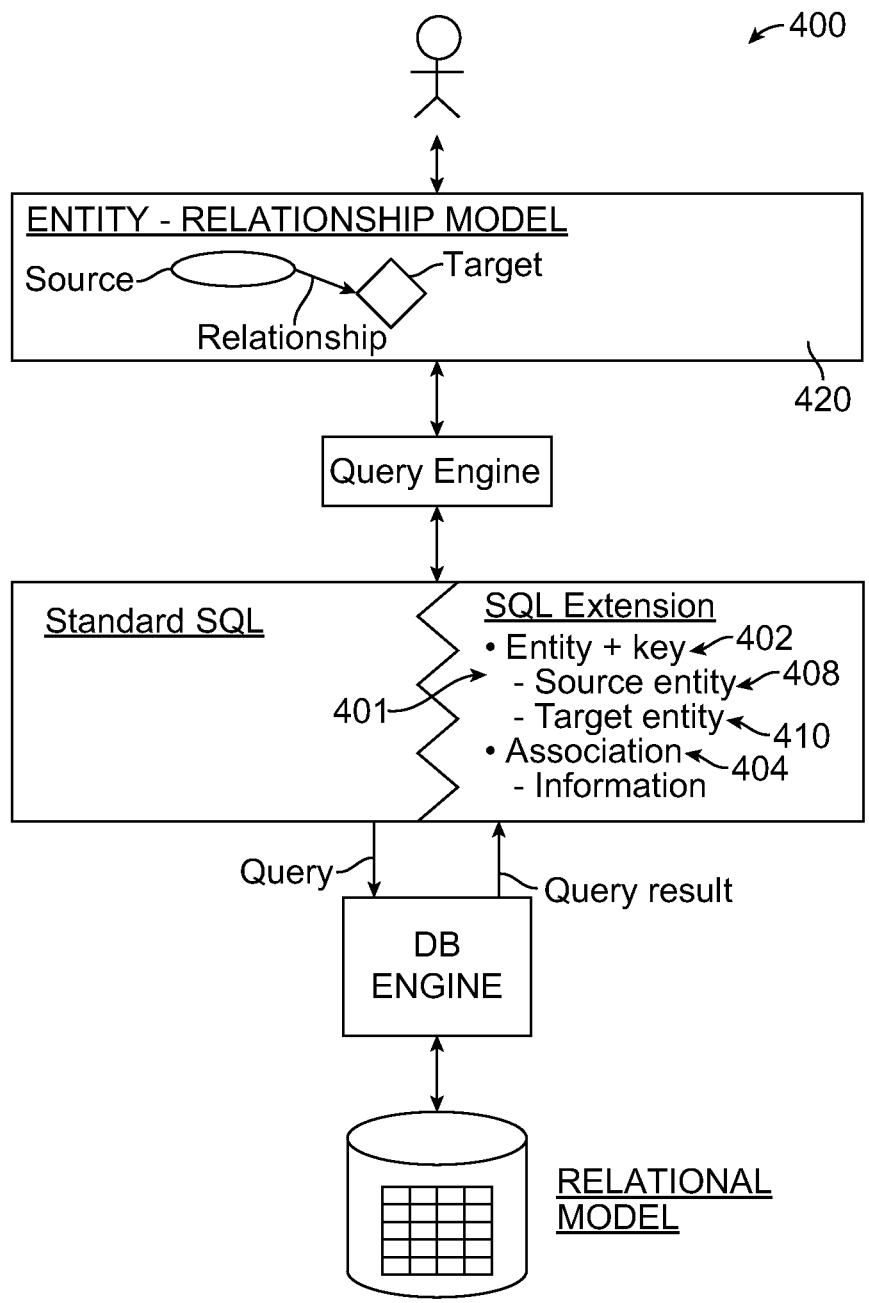
FIG. 4 is a simplified view showing an approach for extending SQL according to embodiments.

FIG. 4 is a simplified view showing an approach for extending SQL according to embodiments. As shown in the system 400 of FIG. 4, one concept underlying embodiments as described herein, is the use of entities 401 with structured types, in contrast with a conventional relational database which uses only flat tables. Entities are structured types with an underlying persistency and a unique key 402. Structured types are records of named and typed elements. An entity key is formed of a subset of the elements of the entity that uniquely identify instances. Views are entities defined by a query, which essentially defines a projection on underlying entities.

Another concept underlying entities as described herein, involves employing associations 404 on a conceptual level. This approach contrasts with the conventional use of hand-managed foreign keys. Associations define relationships between entities, and are specified by adding an element with an association type to a source entity 408 that points to a target entity 410. As shown in the FIG. 4, the relationship implemented by the association type, between source entity type and the target entity type, reflects the actual relationship between entities in the overlying ERM model 420. Using the type definition, associations may capture metadata about relationships present in the ERM in a 'reflectable' way. According to such a reflectable characteristic, a consuming portion of code receiving a piece of data from the database can get back to the type information (i.e., metadata) provided for the respective elements in the data model.

The association may be complemented by optional further information (e.g., regarding cardinality, which keys to use, additional filter conditions, etc.) up to a complete JOIN condition. According to embodiments, the clause-based syntax style of standard SQL may be adopted for specifying the various parameters without sacrificing readability.

In addition, the extended DDL works with custom-defined Types instead of being limited to primitive types only. The extended DDL may also add other enhancements, such as annotations, to enrich the data models with additional metadata, constraints, or calculated fields.

Figure 5:
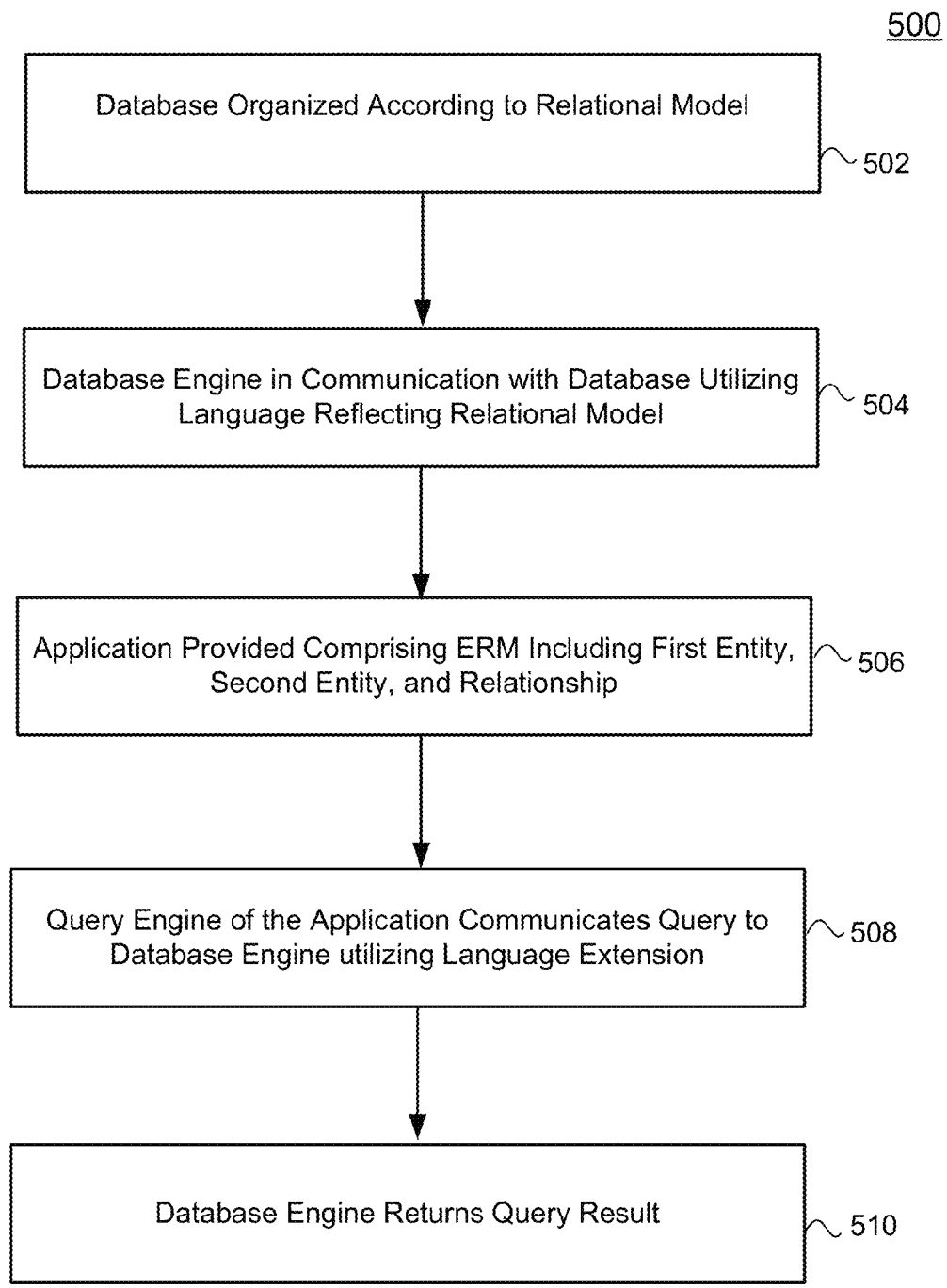
FIG. 5 is a simplified diagram illustrating a process flow according to an embodiment.

FIG. 5 is a simplified diagram illustrating a process flow 500 according to an embodiment. In a first step 502, a database is provided comprising data organized according to a relational model.

In a second step 504, a database engine is provided in communication with a database utilizing a language describing the relational model. In a third step 506, an application is provided comprising an entity-relationship model (ERM) including a first entity, a second entity, and a relationship between the first entity and the second entity.

In a fourth step 508, a query engine of the application communicates a query to the database engine utilizing a language extension providing the entity and relationship components of the ERM. The language extension may comprise a first structured entity type including a first key and indicating the first entity, a second structured entity type including a second key and indicating the second entity, and a third structured association type reflecting the relationship. The association type may be complemented with further additional information.

In a fifth step 510, the database engine returns a query result to the query engine based upon the language extension.

EXAMPLES

Some examples of extension of the SQL database language to provide entities and associations of ERMs, are now given below.

```
entity Address {
  owner : Association to Employee;    // can be used for :m associations
  streetAddress; zipCode; city;       // snipped type defs
  kind : enum { home, business };
}
```

-continued

```
entity Employee {
    addresses : Association[0..*] to Address via backlink owner;
    homeAddress = addresses[kind=home]; // → using XPath-like
       filter.
}
Association to Address;
Association to Address { zipCode, streetAddress };
Association [0..*] to Address via backlink owner;
Association [0..1] to Address via backlink owner where kind=home;
Association [0..*] to Address via backlink owner where zipCode like
   '76*';
Association [0..*] to Address via entity Emp2Adr;
Association [0..1] to Address via entity Emp2Adr where kind=home;
Association [0..*] to Address on owner=this;
Association [0..*] to Address on Address.owner._id = Employee._id;
Association to Address on owner=this AND kind=home;
```

For specifying syntax, embodiments may use a derivate of the Backus Naur Form (BNF) family of metasyntax notations used to express a context-free grammar, and which can be relied upon to make a formal description of a computer language. The basic constructs may be summarized as follows:

| Construct | Notation | Comments |
| --- | --- | --- |
| definition | = | Definitions are written with a single equals sign, e.g. Rule = ... |
| extension | += | Extends a definition introduced before by additional rules |
| terminal symbol | keyword | Language keywords are set in bold red |
| terminal character | "." | Single-character language symbols are set in double quotes |
| alternation | ... | ... | Pipe symbols separate alternatives, e.g. foo and bar | zoo w/ car |
| grouping | ( ... ) | Parenthesis group constructs, e.g. ( foo | bar ) with car |
| option | [ ... ] | Square brackets designate optional constructs, e.g. [ optional ] |
| repetition | ... * | 0+ repetitions are indicated by appended "*", e.g. zeroOrMore* |
| repetition | ... + | 1+ repetitions are indicated by appended "+", e.g. oneOrMore+ |
| comment | -- ... | Comments start with a double-dash, e.g. -- this is a comment |

Syntax for SQL extended to include entities and associations as described herein, may be described as follows:

```
AssignedType += | AssociationType
AssociationType = Association [ cardinality ] (to targetEntity ) [
    managedJoin | unmanagedJoin ]
cardinality = "[" [( maxs |* ) "," ] [ min .. ] ( max|* ) "]" | "[ ]"
targetEntity = QualifiedName
managedJoin = ( forwardLink | backwardLink | mediatedLink ) [ where
    filterClause ]
    forwardLink = "{" foreignKeys "}"
    backwardLink = via backlink reverseKeys
    mediatedLink = via entity entityName
    foreignKeys = targetKeyElement [ AS alias ] [ "," foreignKeys ]
    reverseKeys = targetKey Element          [ "," reverseKeys ]
    targetKeyElement = elementName ( "," elementName )*
unmanagedJoin = on filterClause
```

From DDL perspective, association is a new primitive type that is specified with the type name Association, followed by several parameter clauses to specify requisite metadata. These parameter clauses are as follows:

Cardinality allows specifying the relationship's cardinality in the form of [min . . . max], with max=*denoting infinity and "[ ]" as a shorthand for [0 . . . *]. As a default, if omitted [0 . . . 1] is used as the default cardinality. An example is:

Associotion[ ] to Address via backLink owner;

To targetEntity specifies the association's target entity. A qualified name is expected, referring to another entity (incl. views). Specifying the target is mandatory—there is no default.

{foreignKeys} allows specifying a combination of alternative key elements in the target entity, to be used to establish the foreign key relationship. Where a key element is in a substructure on the target side, an alias name is to be specified. Further details are provided below regarding associations represented as foreign key relationships.

If omitted, the target entity's designated primary key elements are used. The following are examples:

```
Association to Address { zipCode, streetAddress };
Association to Address { some.nested.key AS snk };
```

Another parameter clause is VIA backlink: reverseKeys. For 1:m associations, it is mandatory to specify target elements, which are expected to be a key combination matching the source's primary keys or an association referring to the source entity. An example is:

Association to Address via backLtnk owner;

Another parameter clause is VIA entity: entityName. For m:m associations, it is mandatory to specify a link table's entity name. That name can either refer to a defined entity or a new entity will be created as follows:

```
entity <entityName> {
    <nameOfSourceEntity> : Association to <SourceEntity>;
    <nameOfTargetEntity> : Association to <TargetEntity>;
}
```

If the data model contains an explicit definition of the link table entity, that entity must adhere to the template shown above. It can, in addition, add other elements. An example is given below:

```
Association to Address via entity Employee2Address;
entity Employee2Address {
    employee : Association to Employee;
    address : Association to Address;
}
```

The WHERE filterClause allows specifying additional filter conditions that are to be combined with the JOIN conditions. This can be especially relevant in combination with VIA backlink or entity clauses. Depending on the filterCondition this can reduce a base :m relationship to one with a:1 cardinality. An example is given below:

Association to Address[0 . . . 1] via backLink owner where kind=home;

The ON filterClause allows fully specifying an arbitrary join condition, which can be any standard SQL filter expression. Using this option results in the respective association being user-managed. That is, no foreign key elements/fields are created automatically. The developer is expected to explicitly manage the foreign key elements, including filling them with appropriate foreign key values in write scenarios. An example is given below:

Association to Address on owner=this;

Element names showing up in VIA, WHERE, and ON clauses, are resolved within the scope of the target entity's type structure. Siblings can be referred to by prefixing an element with a ".". Elements from the scope above can be referred to by prefixing an element with " . . . ", etc.

In addition, the outer entity's top-level scope can be referred through the pseudo variable "this", which is described further below in connection with Pseudo Variables in QL.

According to embodiments, associations are represented as foreign key relationships. In the relational model, associations are mapped to foreign key relationships. The foreign key elements are usually created automatically as described in the following sections. In particular, an element with association type is represented as a nested structure type containing foreign key elements corresponding to the target entity's primary key elements—i.e. having the same names and types. The following are examples of definitions which may be given:

```
entity Employee { ...
address1    : Association to Address;
address2    : Association to Address { zipCode, street Address };
addresses   : Association to Address[0..*] via backlink owner;
}
```

In this example, the association elements would implicitly be defined with a nested structure type containing foreign key elements in the :1 cases (plus additional metadata about the association) as follows:

```
    entity Employee { ...
    address1 {
    _ID                  : type of Address._ID;
    }
      address2 {
      zipCode            : type of Address.zipCode;
      streetAddress      : type of Address.streetAddress;
      }
      addresses { /* none at all since :m */ }
}
```

Following the rules for mapping structured types to the relational model as specified above, the underlying table would be created:

```
        CREATE TABLE Employee ( ...
        "address1._ID" Integer,
        "address2.zipCode" String(...),
        "address2.streedAddress" String (...)
        )
```

Rules for representing associations in the persistence model may apply, as indicated in the table below:

| If . . . is specified | for to-one cases, e.g. [0 . . . 1] | for to-many cases |
|---|---|---|
| <no join clause> | Nested foreign key elements are created for target's primary key elements. | not allowed |
| { foreignKeys } | Nested foreign key elements are created for the elements specified in foreignKeys. | |
| VIA backlink reverseKeys | No nested foreign keys are created; instead the reverseKeys are expected to link back from target to source. | |
| VIA entity entityName | No nested foreign keys are created; instead the link table named entityName is created/used as described above. | |
| ON joinCondition | No nested foreign key elements are created; managing the foreign key relationship is completely up to the developer. | |

Consistent with the approach in SQL, no plausibility checks are enforced (e.g., checking whether target key elements specified in {foreignKeys} fulfill the uniqueness requirements). Also, no implicit referential integrity checks are enforced at runtime.

According to embodiments, associations may be in custom-defined types. As associations are special types, they can principally be defined not only for elements in entity definitions, but in type definitions in general. For example, the following definition of the association Amount.currency is valid DDL content:

```
entity Currency {            // List of pre-defined Currencies
key code : String(3);
description : String(33);
}
type Amount {
value : Decimal(10,2);
currency : Association to Currency;
}
```

An actual relationship between entities is established when using the type Amount for an element within an entity definition, as in:

```
entity Employee {
    salary : Amount;
    address : Association to Address;
}
```

The code shown above essentially indicates that the entity Employee has two associations—one association is to Address and another association is to Currency within its salary element.

Associations in custom-defined types may only be supported for a simple "to-one" relationship with a foreign key on the source side. That is, associations with via backlink or via entity clauses may not be supported for elements in custom-defined types.

Associations in Query Language (QL) are now discussed.

Querying Associations with :m Cardinality

Resolving associations or compositions with 1:m cardinality using path expressions or nested projection clauses with the flattening operator "." in place results in flat result sets with duplicate entries for the 1: side, which is in line with standard SQL JOINs and the relational model.

As examples, in the following queries, "addresses" refers to an association with "to-many" cardinality [0 . . . *]:

```
SELECT name, addresses.city FROM Employee;
SELECT name, addresses.{ zipCode, city } FROM Employee;
```

The result sets for the example queries above, are shown below, each with the same value for name repeated/duplicated for each found entry on the :m Address side:

```
<Result Set 1> { name, city }
<Result Set 2> { name, zipCode, city }
```

Embodiments also allow the return of 'Deep' Result Sets. Specifically, in addition to the standard flattening behavior, the introduction of nested projection clauses and structured result sets principally allows expression of 'deep' queries along :m associations. These deep queries return 'real deep' result sets having the 1: sides elements on a top level, with nested tables/sets for the :m sides.

For example, the deep query:
SELECT name, addresses {zipCode, city} FROM Employee;
would be expected to return a result set with a nested collection as shown below:

```
<Result Set> {
  name,
  addresses : <collection of> Address { zipCode, city }
}
```

Such deep querying may provide certain benefits. One possible benefit is to allow retrieving larger structures through a single query.

Currently, in the absence of deep querying, such larger structures may frequently be obtained in a brute-force approach, through 1+n queries with n being the number of records returned by a 1: side query. This is detrimental to performance, particularly if such a query spans several levels of to-many associations.

While the other extensions can be realized by translating to standard SQL queries, this one requires adding special support deep within the query engine. The absence of such support may preclude using to-many associations in the non-flattened way. This is discussed further below in the associations of FROM clauses, regarding how association trees can be traversed.

Associations in WHERE Clauses

Associations can arise not only in projection clauses but also in filter conditions in WHERE clauses. Respective comparison operators may be enhanced to support associations, as depicted in the following examples:

```
1. SELECT ... from Employee WHERE orgunit={ _id: '4711' };
2. SELECT ... from Employee WHERE homeAddress={
   zipCode: '76149', streetAddress: 'Vermontring 2'
};
3. SELECT ... from Employee WHERE orgunit='4711';
4. SELECT ... from Employee WHERE homeAddress.city like 'Wall%';
5. SELECT ... from Employee WHERE homeAddress.city IN ( 'Walldorf', ... );
6. SELECT ... from Employee WHERE address IS NULL;
7. SELECT ... from Employee WHERE address[kind=home].city = 'Walldorf';
8. SELECT ... from Employee WHERE homeAddress = addresses[kind=home];
```

Several issues arising within the examples immediately above, may be worthy of note. In connection with:
ad 1, 2: A record literal can be passed to a comparison with an association, with elements that match the combination of the foreign keys.
ad 3: Support for Association type in QL includes automatic coercions of typed scalars or string representations thereof to single-key associations.
ad 4: One can also refer to the individual key values using standard path expressions.
ad 5: Other SQL comparison operators can be used, such as LIKE, IN, IS NULL, . . . .
ad 7: It can be combined with XPath-like filter expressions.
ad 8: It can be combined with compare associations, provided they are assignable.

The above provides just a few examples to give the idea. In general, every condition that is possible with standard SQL expressions shall be possible to do with associations as well, including sub queries with exists and not exists, etc.

Associations in FROM Clauses

Embodiments may also allow associations in FROM clauses. Specifically, host languages may provide support for representing associations as typed variables or elements. This is described below in connection with association types in host languages.

Accordingly, one can traverse along associations, as shown in the following examples (in some pseudo language):

```
var daniel = SELECT name, homeAddress FROM Employee WHERE name='Daniel';
// ... and somewhat later, maybe at some other place in an application...
van addresses = SELECT * FROM Address WHERE this=daniel.homeAddress;
```

The expression this=<an association> can be used. The comparison this=<an association> can be retrieve an entity by a given association. The pseudo variable this is always an alias for the entity given in the FROM clause. Therefore, the statement above actually resolves to:
SELECT*FROM Address this WHERE this=daniel.homeAddress;
The comparison this=<an association> compares a queried entity with a given association—the association must be of type Association to <queried entity>[ . . . ]. This expands to a WHERE clause corresponding to the ON condition resolved from the association. In this case it would actually resolve to:

```
SELECT * FROM Address this
    WHERE this.zipCode = daniel.homeAddress.zipCode
        AND this.streetAddress = daniel.homeAddress.streetAddress
        AND this.type = 'home';
```

Embodiments may also allow the use of SELECT from association. Specifically, association-traversal code patterns like the one below are frequently seen:
SELECT*from Address WHERE this=daniel.homeAddress;
An association in general, and a programming language variable with association type support in particular, carries all information about a target record—essentially providing information as to which entity goes with which key. Thus equivalent to the query above, embodiments allow the shorthand below for traversing associations:
SELECT*from daniel.homeAddress;
In general, a query statement of the form SELECT . . . from <someAssociation> expands to:

```
SELECT ... from <someAssociation>.<targetEntity> WHERE this=<someAssociation>;
```

Here, <targetEntity> signifies the metadata associated with the association corresponding to the target entity specified in the association's declaration using the ON targetEntity clause.

JOINs Declare Ad-Hoc Associations

Embodiments allow JOINs to declare ad-hoc associations. In the case of a missing association, the standard JOIN <target> ON <join condition> clauses as introduced in SQL-92 are still supported, which align with the extensions introduced above, as they naturally introduce associations in an ad-hoc fashion.

For example, in the data model given above, the entity Employee has an association homeAddress, but is lacking a similar association for businessAddress, which can be compensated for using a standard JOIN clause as follows:

```
SELECT FROM Employee e
ASSOCIATION TO Employee2Address e2a ON
   e2a.employee = e
ASSOCIATION TO Address businessAddress ON _id =
   e2a.address._id
AND kind=business
{
ID, name,
businessAddress { streetAddress, zipCode, city }
}
```

The expression may follow the syntax below:

```
JoinClause += | JOIN targetEntity [[AS] Identifier ]
   JoinConditionClauses
```

Other syntax is as discussed above in connection with associations in DDL.

JOIN clauses fit easily into the extensions in DDL and QL. JOIN clauses can be interpreted as an ad-hoc definition of missing associations.

In the example immediately above, the association businessAddress is added. This result is recognized if the projection clause of the example above, is compared to that of the query applied to the domain model if the association were in place (below):

```
SELECT FROM Employee {
   ID, name,
   businessAddress { streetAddress, zipCode, city }
}
```

Embodiments also allow the use of simplified JOIN clauses. In particular, following the observation that JOINs essentially declare ad-hoc associations, embodiments JOINs to be declared using the same clauses that are used to declare associations in DDL. Given this, the above example can be written more easily as follows:

```
SELECT FROM Employee e
ASSOCIATION TO Address businessAddress VIA entity
   Employee2Address
   WHERE kind=business
{
ID, name,
businessAddress { streetAddress, zipCode, city }
}
```

Annotations

Figure 6:
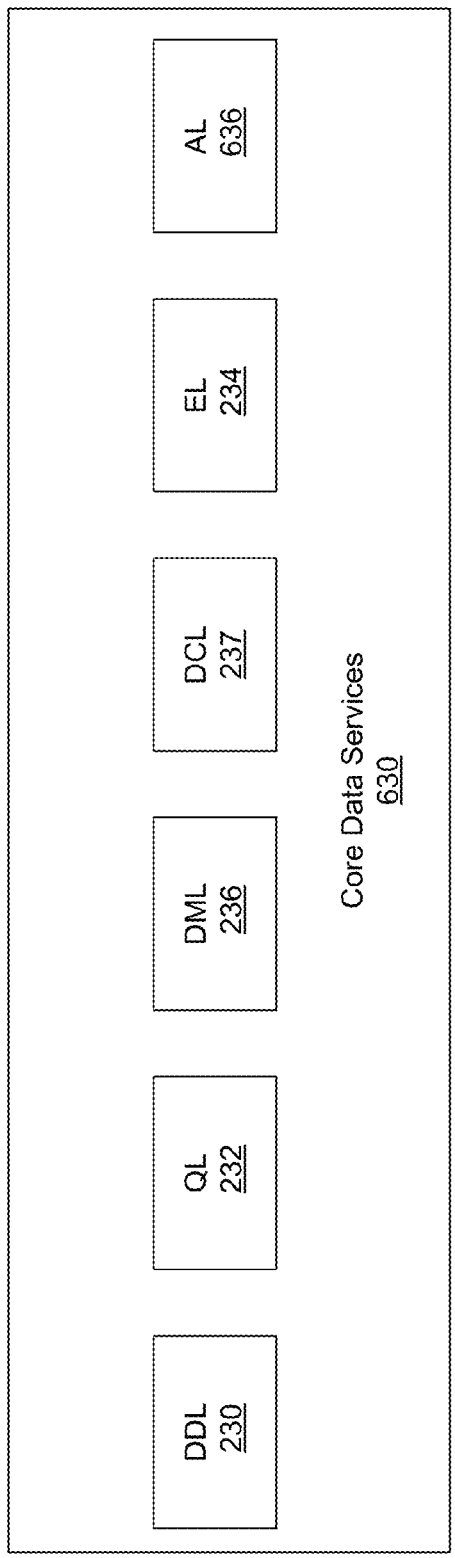
FIG. 6 shows an enlarged view of the core data services of the database structure of FIG. 2 according to embodiments.

FIG. 6 shows a CDS component 630 that may be used as an alternative to the CDS component 130. The CDS component 630 includes the DDL 230, the QL 232, the EL 234, the DML 236, the DCL 237, and an annotation language (AL) 636. AL 636 is referred to herein interchangeably as "annotation". AL 636 may further enrich the semantically rich domain data models defined by DDL 230.

The DDL 230 supports annotations 636 to enrich the data models with additional metadata. Annotations 636 are declared as typed structures of metadata. Instances of the annotations 636 can be assigned to entities and elements of a data model. In various embodiments, annotations 636 are used to enrich types, entities and elements in data model definitions.

Users and clients 150, such as user interface (UI) frameworks, open data (OData) consumption layers, and analytics tools, can define their own extension metadata and store them in-place with an application's data model. At runtime, a user can reflect on the metadata including the annotations 636 using a reflection program, reflection engine, or reflection application programming interface (API). In some embodiments, AL 636 includes a set of predefined annotations.

In some embodiments, the enrichment of annotations 636 may allow OData resources to be fully defined by view building plus OData-specific annotations solely with the combination of DDL 230 and annotations.

Annotations 636 are also very beneficial in the convergence of online transaction processing (OLTP) and online analytic processing (OLAP). By annotating data models with information specific to analytical engines or clients, redundant remodeling of the same things to add the requisite delta information may be avoided. Moreover, a single view may be supported by expressing analytical views with annotated DDL 230 plus QL syntax. Stated differently, annotations 636 give frameworks or consumers a technique to enrich data models with additional metadata without introducing new models and thereby redundantly repeat type structures just for adding a few additional metadata or more as desired. In particular, this allows convergence of data models from transactional and analytical systems.

Defining Annotation Types

Annotations 636 are typed records of metadata. According to embodiments, new annotations 636 may be introduced by defining a new structured type that is introduced with the keyword annotation instead of the keyword entity.

One example for annotation is as follows:

```
annotation required : boolean default true;
annotation Comment {
    descr : String(111) @>required;
    localized [ ] {
      language : char(3) default 'en';
      text : String(1111) default ..descr;
    }
}
```

The syntax for this example is as follow:

```
AnnotationDefinition = [ define ] annotation typeName TypeSpec
ContextDefinition += | AnnotationDefinition
DerivedType += [ cardinality ]
StructuredType += [ cardinality ] <base definition>
cardinality = "[" min .. ( max|* ) "]" | "[ ]"
```

From the perspective of the DDL 23U, Annotation is a primitive type that is specified with the type name Annotation, followed by several parameter clauses to specify requisite metadata.

The element typeName specifies the name of a defined annotation type.

Cardinality allows adding cardinalities to type specifications in the form of [min . . . max], with max=*denoting infinity and "[ ]" as a shorthand for [0 . . . *]. In some embodiments, cardinalities distinguish scalars from arrayed types—with additional metadata to be used for constraint checks. As a default, if omitted [0 . . . 1] is used as the default cardinality. In some embodiments, a cardinality greater than 1 implies that the type is an arrayed type with the base type used for its entries.

In some embodiments, the expression specified for default or a constant element in annotation is restricted to an expression that can be resolved at compilation time, such as reference to literals and identifiers resolving data that can be computed during compilation.

In general, any user may introduce new annotations. In some embodiments, usage of annotation is limited to only selected cases controlled by a system administrator.

Assigning Annotations

According to embodiments, a defined annotation type can be used to annotate types, entities and views and individual elements therein. Annotating an object or element is viewed as creating a literal instance of the annotation type and assigning this instance to the annotated object or element.

Examples

The following is an example of annotations for entity definitions for customers:

```
@Comment.descr: 'Customer'
entity Customer {
    @Comment: { descr: 'First Name', localized: [
        { language: 'en', text: 'This is the customers first name'
    },
        { language: 'de', text: 'Das ist der Vorname des Kunden' }
    ]}
    firstname : String(44);
    @Comment.descr: 'Family Name'
    @Comment.localized: { language:'de', text: 'und das der
    Nachname'
    }
    surname : String(44)   @<required;
    ...
}
```

The following is an example of annotations for view definitions for viewing customers:

```
@Comment.descr: 'Customers'
view CustomerView as SELECT from Customer {
    firstname, surname @<required: false,
    @Comment: { descr: 'Full Name', localized.text: 'the names
    concatenated'}
    firstname+" "+ surname as displayName
    ...
}
```

An example syntax for DDL 230 enhancements for pre-annotations and post-annotations within the DDL 230 is as follows:

```
@PreAnnotations = ( "@" Annotation )*
@PostAnnotations = ( "@<" Annotation )*
Annotation = typeName ( "." element )* [ ":" Literal ]
```

An example syntax for DDL 230 enhancements for annotating types, entities and elements within the DDL 230 is as follows:

```
DataTypeDefinition += [ @PreAnnotations ] <base definition>
ElementDefinition += [ @PreAnnotations ] <base definition> [
    @PostAnotations ] ";"
```

An example syntax for DDL 230 enhancements for annotating parameters in view definitions in the DDL 230 is as follows:
ParameterDefinition+=[@PreAnnotations]<base definition>[@PostAnotations]

An example syntax for DDL 230/QL enhancements for annotating elements in view definitions (not for queries in general) may be as follows:
QL:elementaause+=[@PreAnnotations]<base definition>[@PostAnnotations]

Analysis of Annotations

According to embodiments, annotations can generally put in before the annotated definition—e.g., a type, entity, view or element therein. In addition, annotation for elements in a structured type or an entity definition may also appear within the element definition, immediately before the delimiter—e.g., ';' in case of type and entity definitions and ',' in case of a query elements in view definitions (except the last one). Suffixed annotations start with a "@", followed by a "<".

The elements in the syntax include typeName and assignedValue. The element typeName specifies the name of a defined annotation type. The element element specifies a defined element of the annotation type.

The element assignedValue specifies a value to assign to the element. The value is an expression with the same restriction as described above for cardinality default values and derived elements for annotation.

The elements element specifies values for element assignments. Annotation records can be filled by specifying values for all elements or only for selected ones. If only one element is to be specified, an element @Record.element: value can be used, which also may be used for element paths through nested record types.

The element literal are specified based on their parameter values. In some embodiments, the options for automatic coercion pass single records or scalar values to elements with array type (i.e., with cardinality>1).

Scope of Annotations

As described above, annotations can be defined to annotate certain constructs within a data model, e.g., types, entities, views or elements thereof. In some embodiments, if annotations 636 are used in a way that violates this restriction, parsing fails.

According to embodiments, the restriction is defined by the annotation @ Scope as shown in the following example:

```
@Scope: ENTITY
annotation Weight { ... }
@Scope: [ENTITY, VIEW, ELEMENT]
annotation Description { ... }
```

The annotation @Scope is defined as follows:

```
annotation Scope : String(22) enum {
    OBJECT, TYPE, SIMPLE_TYPE, STRUCT_TYPE,
    ENTITY, VIEW, ELEMENT, ASSOCIATION,
    ANNOTATION, CONTEXT, ANY
} [1..*] default ANY;
```

The enumeration symbols are interpreted as follows:
OBJECT subsumes TYPE, ENTITY, VIEW
a TYPE subsumes SIMPLE_TYPE, STRUCT_TYPE If an annotation is not annotated with @Scope, or if the scope is defined as ANY, the annotation is not restricted to any specific construct. The annotation @Scope may be a predefined annotation.

Figure 7:
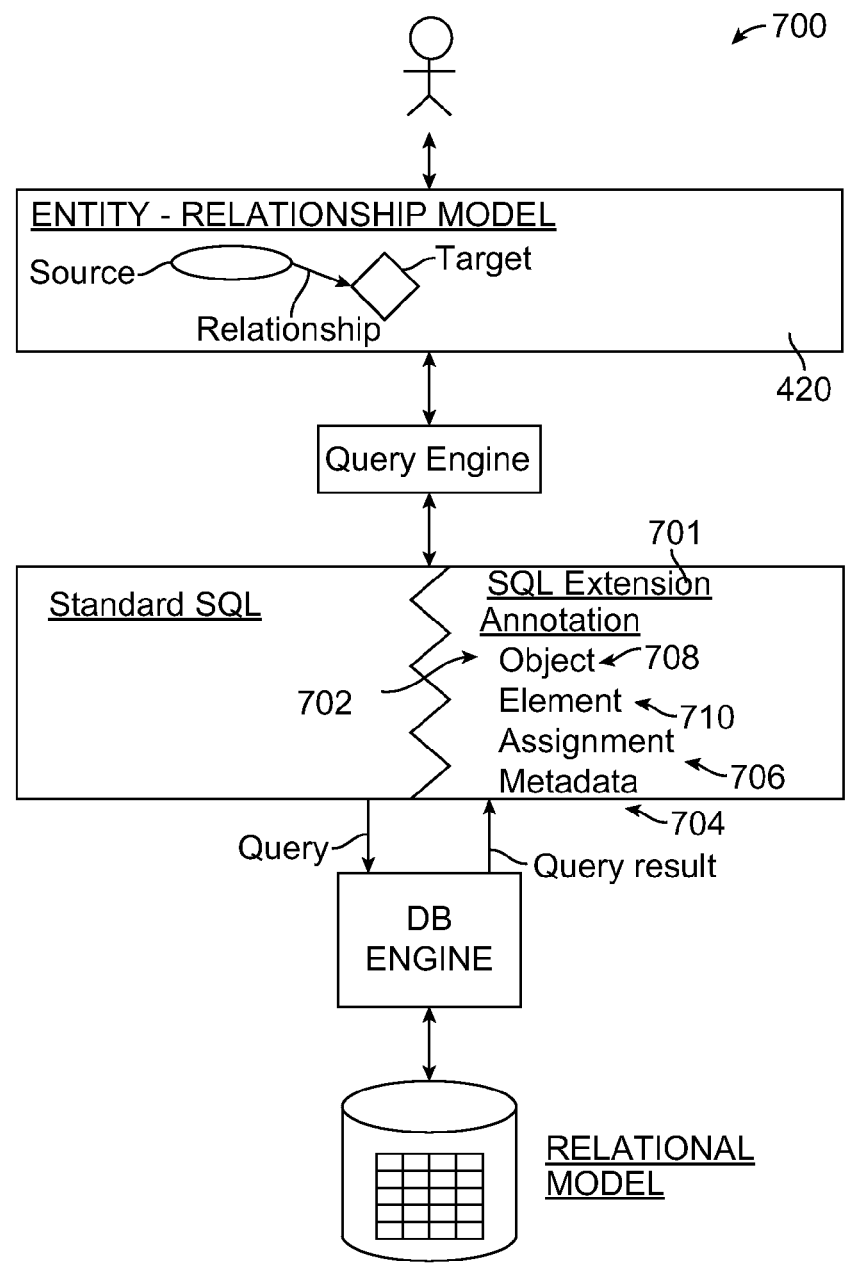
FIG. 7 is a simplified view showing an approach for annotating SQL according to embodiments.

FIG. 7 is a simplified view showing an approach for annotating SQL according to embodiments. As shown in the system 700 of FIG. 7, one concept underlying embodiments as described herein, is the use of entities 701 with structured types. Entities 701 comprise entities 401 described above and further comprise annotations 702. Annotations 702 enrich the data models with additional metadata, constraints, or calculated fields.

Annotations 702 are structured types with metadata 704. Annotating an object 708 or element 710 is viewed as creating a literal instance of the annotation type and assigning this instance (shown as assignment 706) to the annotated object 708 or element 710. Object 708 and element 710 correspond to an object and element, respectively, in the relational model.

Annotations may capture metadata about relationships present in the ERM model in a 'reflectable' way. At runtime, a user can reflect on the metadata including the annotations using a reflection program, reflection engine, or reflection application programming interface (API).

Figure 8:
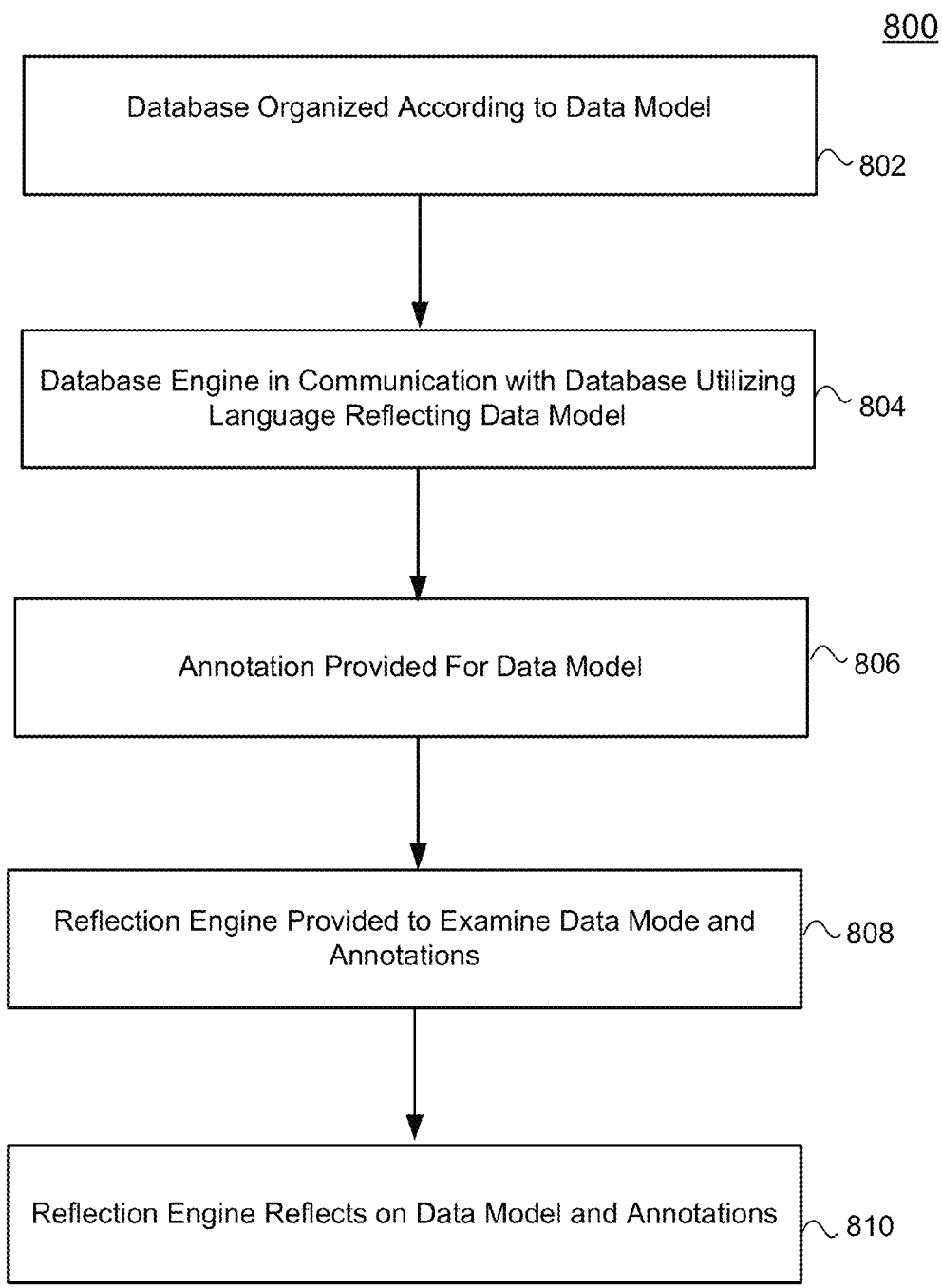
FIG. 8 is a simplified diagram illustrating a process flow for annotations according to an embodiment.

FIG. 8 is a simplified diagram illustrating a process flow 800 for annotations according to an embodiment. In a first step 802, a database is provided comprising data organized according to a data model, such as relational model.

In a second step 804, a database engine is provided in communication with a database utilizing a language describing the data model. For example, the language may be a domain-specific language, such as SQL. In a third step 806, an annotation of the data model is provided. The annotation may comprise metadata. Instances of the annotations 636 can be assigned to entities and elements of a data model. In various embodiments, annotations 636 are used to enrich types, entities and elements in data model definitions.

In a fourth step 808, a reflection engine is provided to examine the data model at runtime. In a fifth step 810, the reflection engine reflects on the data model and the annotations. The reflection engine may examine the metadata of the data model and the annotations.

Figure 9:
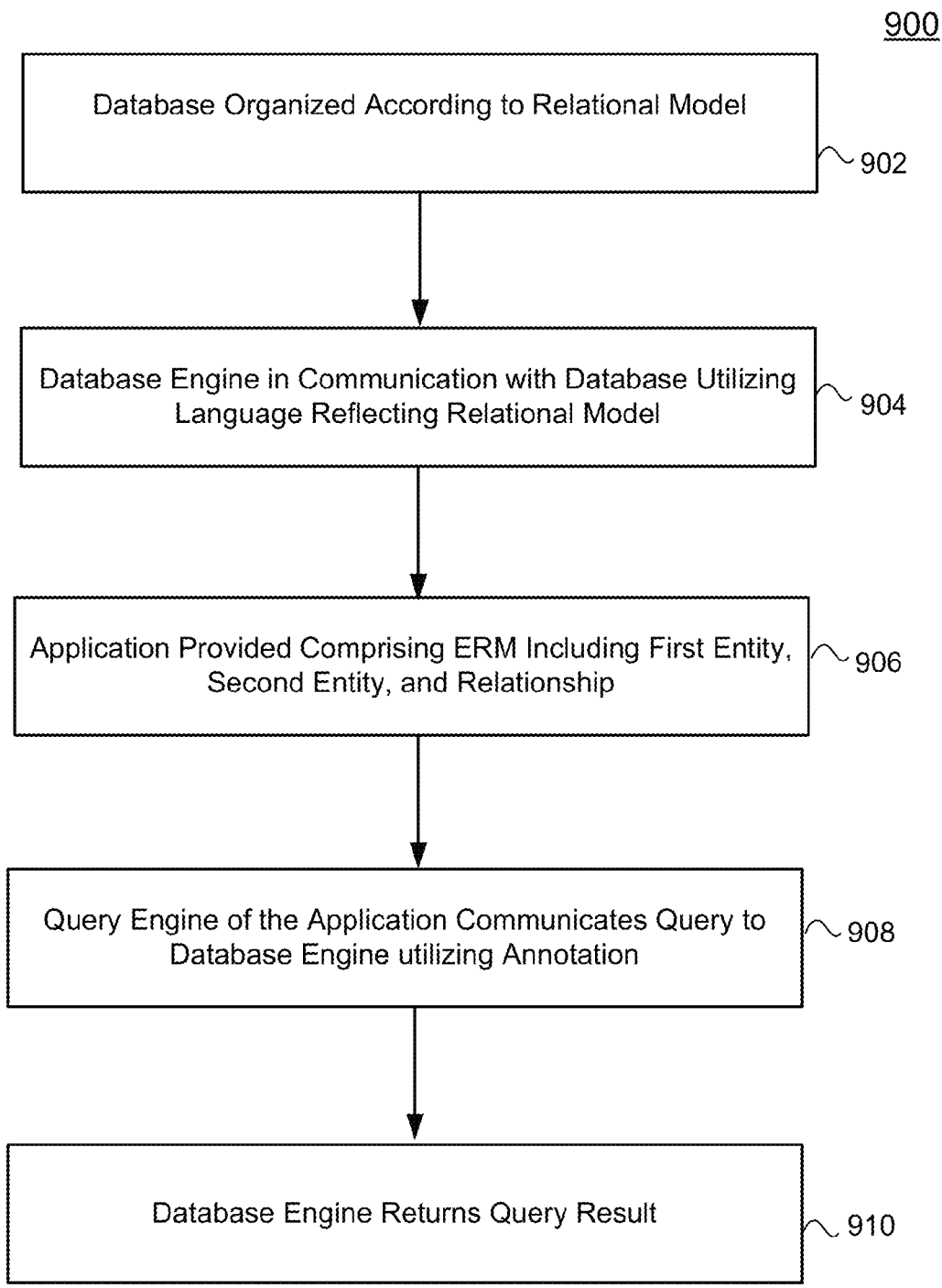
FIG. 9 is a simplified diagram illustrating a process flow for a query using annotations according to an embodiment.

FIG. 9 is a simplified diagram illustrating a process flow 900 for a query using annotations according to an embodiment. In a first step 902, a database comprising data organized according to a data model, such as a relational model, is provided.

In a second step 904, a database engine is provided in communication with a database utilizing a language describing the relational model. For example, the language may be a domain-specific language, such as SQL. In a third step 906, an application is provided comprising an entity-relationship model (ERM) including a first entity, a second entity, and a relationship between the first entity and the second entity.

In a fourth step 908, a query engine of the application communicates a query to the database engine utilizing annotation language. The query may include a standard query based on the relational model and the annotation language.

In a fifth step 910, the database engine returns a query result to the query engine based upon the annotation language.

Figure 10:
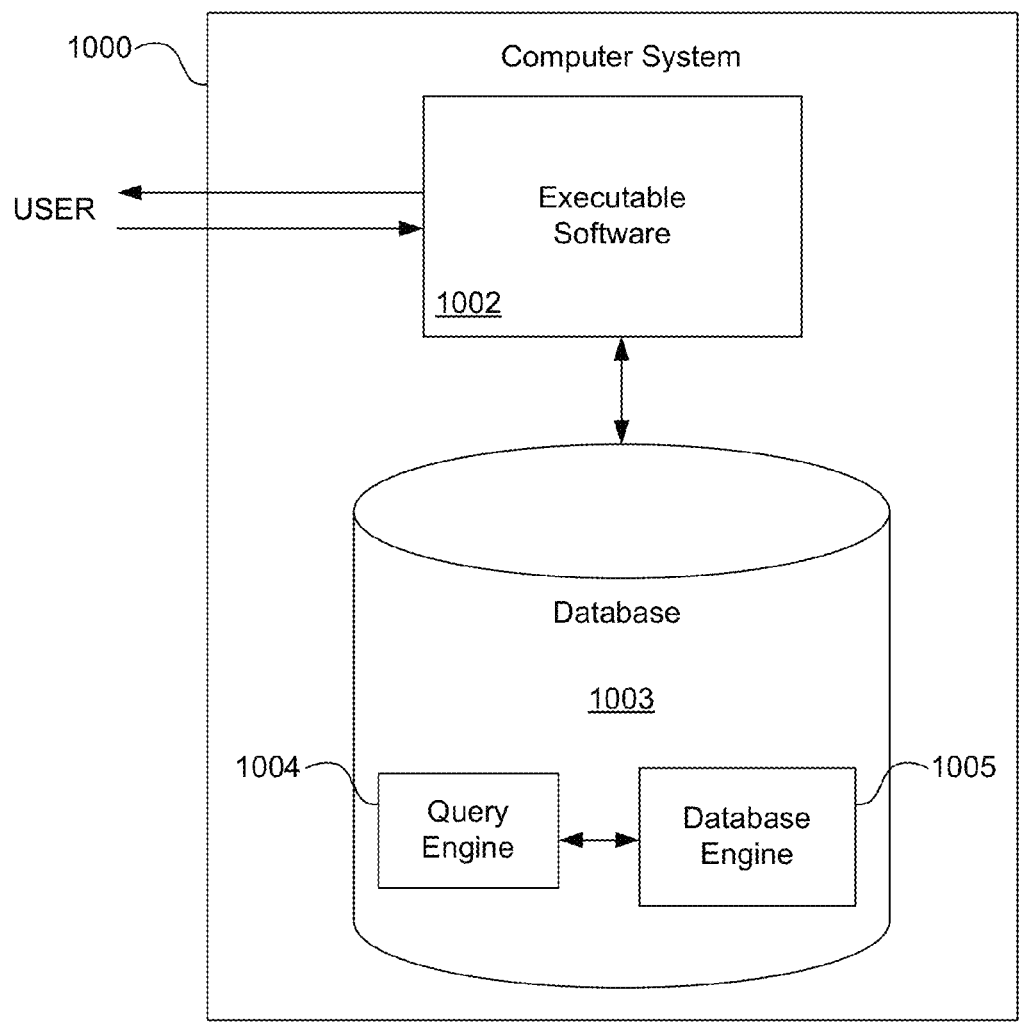
FIG. 10 illustrates hardware of a special purpose computing machine configured to annotate database entity-relationship models according to an embodiment.

FIG. 10 illustrates hardware of a special purpose computing machine configured to annotate database entity-relationship models according to an embodiment. In particular, computer system 1000 comprises a processor 1002 that is in electronic communication with a non-transitory computer-readable storage medium 1003. This computer-readable storage medium has stored thereon code 1004 corresponding to a query engine, such as those described herein. Code 1005 corresponds to a database engine, such as those described herein. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 11:
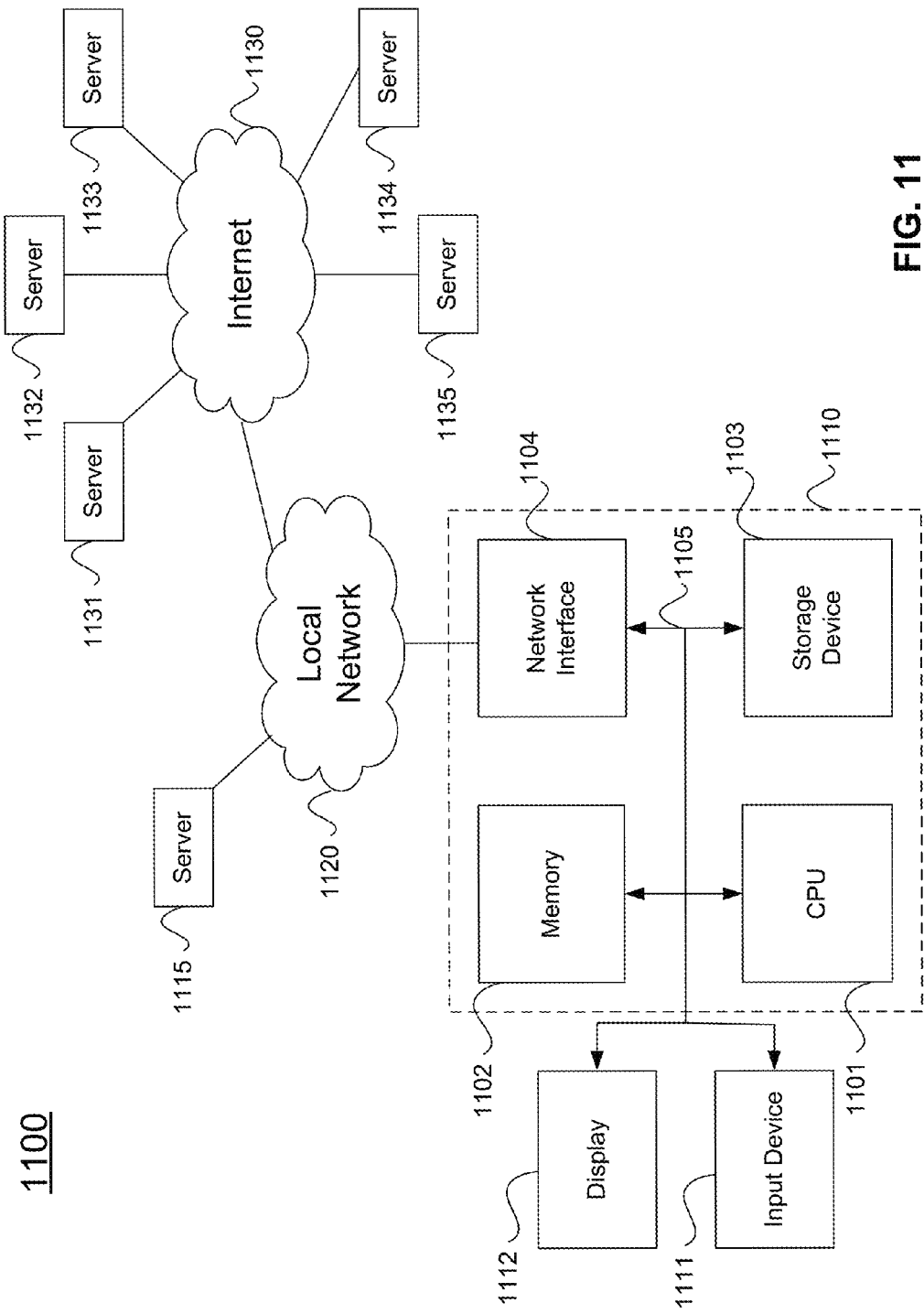
FIG. 11 illustrates an example of a computer system.

An example system 1100 is illustrated in FIG. 11. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable mediums.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   providing Structured Query Language (SQL) extensions for a relational model of a database described by SQL for use in coding database queries to recognize features of an entity-relationship model (ERM) for an application that stores data in the database,
   wherein the SQL extensions include typed data structures for defining entities of the application, associations defining relationships between the entities of the application, and for defining annotations for data models of the application,
   wherein the annotations enable defining additional metadata that extends data definitions of an existing data model of the application without requiring developing a new data model or redundant type structures for the application;
   in a database query engine configured to query the database:
      receiving a database query communicated to the database query engine, wherein the database query is coded in SQL with the SQL extensions;
      translating the database query in the database query engine to query the database; and
      receiving a query result from the database, wherein the existing data model of the application and the additional metadata defined by the extensions of SQL are processed together at runtime in the database query engine.

2. The computer-implemented method of claim 1 wherein native support for the ERM is added into the database query engine to enable processing of the SQL extensions.

3. The computer-implemented method of claim 1 wherein the annotations are added to a pre-defined view of the ERM.

4. The computer-implemented method of claim 1 wherein the annotations include metadata on types, entities and elements in data model definitions of the ERM.

5. A non-transitory computer readable storage medium embodying a computer program for performing a method, said method comprising:
   providing Structured Query Language (SQL) extensions of for a relational model of a database described by SQL for use in coding database queries to recognize features of an entity-relationship model (ERM) for an application that stores data in the database,
   wherein the SQL extensions include typed data structures for defining entities of the application, associations defining relationships between the entities of the application, and for defining annotations for data models of the application,
   wherein the annotations enable defining additional metadata that extends data definitions of an existing data model of the application without requiring developing a new data model or redundant type structures for the application;
   in a database query engine configured to query the database:
      receiving a database query communicated to the database query engine, wherein the database query is coded in SQL with the SQL extensions;
      translating the database query in the database query engine to query the database; and
      receiving a query result from the database, wherein the existing data model of the application and the additional metadata defined by the extensions of SQL are processed together at runtime in the database query engine.

6. A non-transitory computer readable storage medium as in claim 5 wherein native support for the ERM is added into the database query engine to enable processing of the SQL extensions.

7. A non-transitory computer readable storage medium as in claim 5 wherein the annotations are added to a pre-defined view of the ERM.

8. A non-transitory computer readable storage medium as in claim 5 wherein the annotations include metadata on types, entities and elements in data model definitions of the ERM.

9. A system comprising:
   a database organized according to a relational model described by a Structured Query Language (SQL);
   a database query engine in communication with the database, the database query engine comprising at least one processor and a memory configured to store computer programs, which when executed by the processor, cause the processor to:
   provide SQL extensions for the relational model of the database described by SQL for use in coding database queries to recognize features of an entity-relationship model (ERM) for an application that stores data in the database,
   wherein the SQL extensions include typed data structures for defining entities of the application, associations defining relationships between the entities of the application, and for defining annotations for data models of the application,
   wherein the annotations enable defining additional metadata that extends data definitions of an existing data model of the application without requiring developing a new data model or redundant type structures for the application;

in a database query engine configured to query the database:

receive a database query communicated to the database query engine, wherein the database query is coded in SQL with the SQL extensions;

translate the database query in the database query engine to query the database; and receive a query result from the database, wherein the existing data model of the application and the additional metadata defined by the extensions of SQL are processed together at runtime in the database query engine.

10. A system as in claim 9 wherein native support for the ERM is added into the database query engine to enable processing of the SQL extensions.

11. A system as in claim 9 wherein the annotations are added to a pre-defined view of the ERM.

12. A system as in claim 9 wherein the annotations include metadata on types, entities and elements in data model definitions of the ERM.

13. The computer-implemented method of claim 1 wherein the typed structures include custom-defined types.

14. The computer-implemented method of claim 1 wherein annotating an entity, object, or element in the data model comprises generating an instance of the annotation type and assigning the instance to the entity, object, or element.

15. The computer-implemented method of claim 1 wherein code of the application that receives data from the database is operable to recover type information for elements of the data model of the application based on the SQL extensions.

* * * * *